United States Patent [19]

Lewis

[11] 4,267,948
[45] May 19, 1981

[54] CARGO CARRIER

[76] Inventor: David W. Lewis, 169 Otto Cir., Sacramento, Calif. 95822

[21] Appl. No.: 47,232

[22] Filed: Jun. 11, 1979

[51] Int. Cl.³ .................... B60P 3/40; B62D 33/00
[52] U.S. Cl. .................... 224/42.34; 211/191; 296/3
[58] Field of Search .............. 224/42.32, 42.34, 42.43, 224/42.44, 42.45 R, 273, 309, 320, 321; 296/3, 7, 8, 10, 12; 211/175, 190-194, 206

[56] References Cited

U.S. PATENT DOCUMENTS

| 2,318,909 | 5/1943 | Woods | 244/123 X |
|---|---|---|---|
| 2,720,414 | 10/1955 | Hart | 296/3 X |
| 2,947,566 | 8/1960 | Tower | 296/3 X |
| 3,224,805 | 12/1965 | Clyatt | 224/309 X |
| 3,365,230 | 1/1968 | Langdon | 296/3 |
| 3,589,576 | 6/1971 | Rinkle et al. | 224/320 X |
| 3,594,035 | 7/1971 | Ferguson | 224/309 X |
| 3,602,373 | 8/1971 | Cassel | 211/191 X |
| 3,765,713 | 10/1973 | Suitt | 224/309 X |
| 4,057,281 | 11/1977 | Garrett | 224/42.32 X |
| 4,152,020 | 5/1979 | Brown et al. | 296/3 |

Primary Examiner—Stephen Marcus
Attorney, Agent, or Firm—Melvin R. Stidham

[57] ABSTRACT

A cargo carrier adapted to fit a wide range of models, makes and styles, including pickup trucks. A pair of side rails, preferably channels, are supported on legs which are to be bolted to the truck side panel. At the tops of the legs are angle mounting brackets, each with a horizontal portion which hooks over the lower flange of the channel member and an upright portion which is bolted to the web of the channel member. The front legs are bolted through a selected one of a series of bolt holes in the channel to adapt to the particular truck bed length. Load-carrying cross bars are of tubular construction and have threaded nuts welded in the ends thereof so that they may be bolted to the channel members. The channel members are in at least two sections with an intermediate, extender section being optional for long truck beds. The all-bolted construction facilitates packing and shipping for on-site assembly.

6 Claims, 9 Drawing Figures

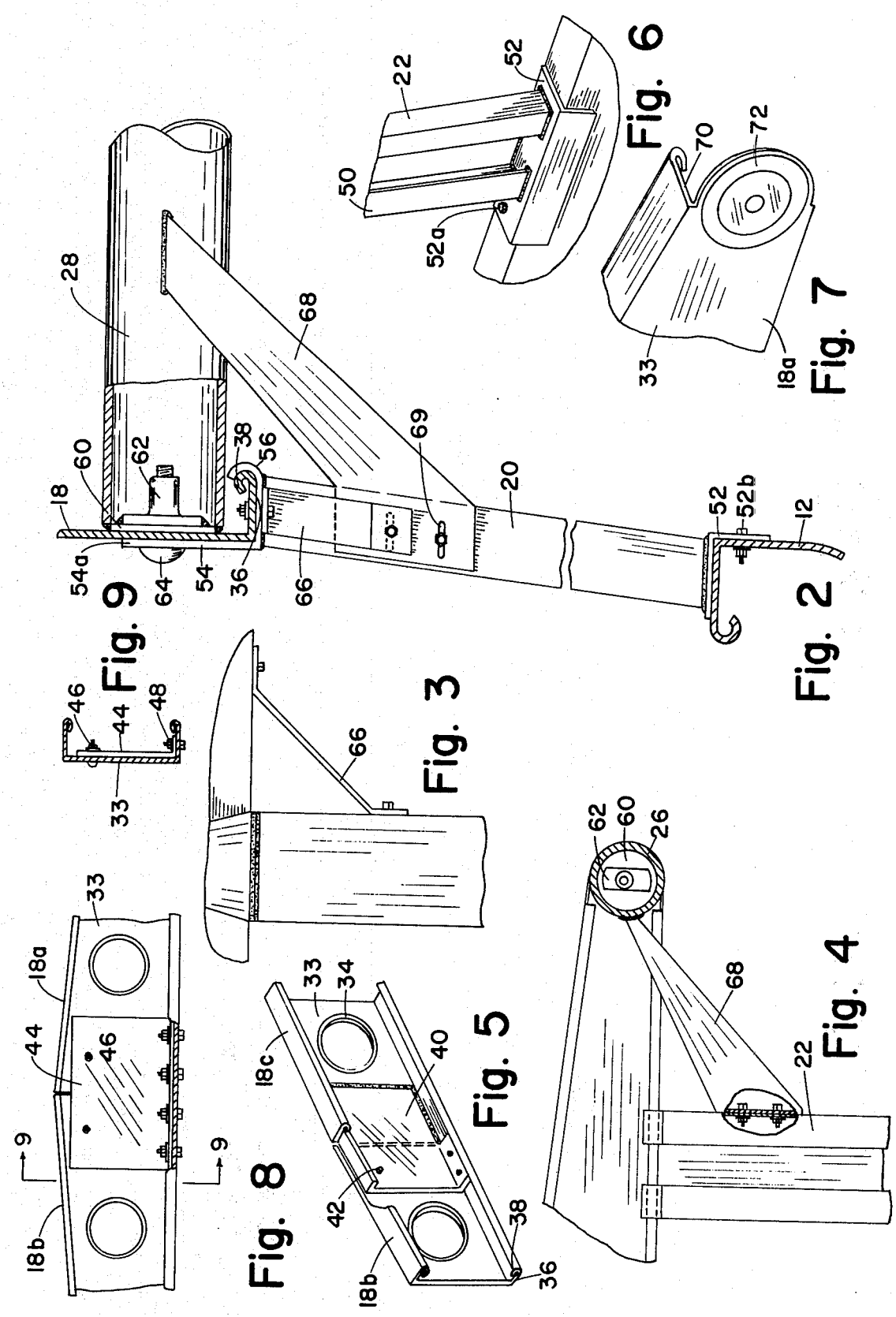

CARGO CARRIER

BACKGROUND OF THE INVENTION

A number of truck racks designed to carry lengthy objects above the truck bed and cab of a pickup truck are currently available. However, such are generally of welded construction and are custom made for a particular truck bed size and design. Such racks are either formed in their entirety of major components are welded at the factory making handling and shipping unwieldy.

OBJECT OF THE INVENTION

It is an object of this invention to provide a cargo carrier for a truck which may be manufactured in small, easily assembled components.

It is a further object of this invention to provide a cargo carrier for a wide variety of pickup truck sizes to faciliate maintaining an inventory thereof.

It is a further object of this invention to provide a cargo carrier for pickup truck with components easily assembled and bolted together.

It is a further object of this invention to provide a cargo carrier for a wide range of pickup truck models and makes.

It is further object of this invention to provide a cargo carrier for a pickup truck which may readily be removed and easily stored.

Other objects and advantages of this invention will become apparent from the description to follow particularly when read in conjunction with the accompanying drawing.

BRIEF SUMMARY OF THE INVENTION

In carrying out this invention, I provide a pickup truck cargo carrier having side rails of channel construction which are made up of fore and aft sections to be bolted together. An intermediate extender section is provided for longer truck beds. Also provided are pairs of front and rear legs which have channel support brackets at their upper ends. The front legs may be attached at any one of several bolt holes to adjust to the length of the truck bed. A horizontal portion of the mounting bracket hooks over the lower flange of the channel member and the vertical portion is bolted to the web thereof. Tubular loadcarrying cross members have threaded nuts welded coaxially in the ends thereof so that they may be bolted to the side rails. In the case of the front leg, a single bolt secures the side rail to the leg support bracket and to the tubular cross bar. Gussettlike reinforcing members welded to the tubular cross bars are also bolted to the legs. Through slots so that the angles of the legs may be varied to adjust to the width of the truck bed. Angle supports at the lower end to the legs may be bolted either to the top or side of the truck side panels.

BRIEF DESCRIPTION OF THE DRAWING

In the drawings:

FIG. 2 is a partial section view taken through the carrier toward the front supporting legs;

FIG. 3 is a partial side view of the front leg support and bracket;

FIG. 4 is a partial side view of rear leg support and cross bar;

FIG. 5 is a partial view of side rail extender section

FIG. 6 is a partial view of a leg support;

FIG. 7 is a partial view of the end of the side channel rail;

FIG. 8 is a partial side view of a side rail connector member;

FIG. 9 is a section view taken along line 9—9 of FIG. 8.

DESCRIPTION OF A PREFERRED EMBODIMENT

Figure 1:
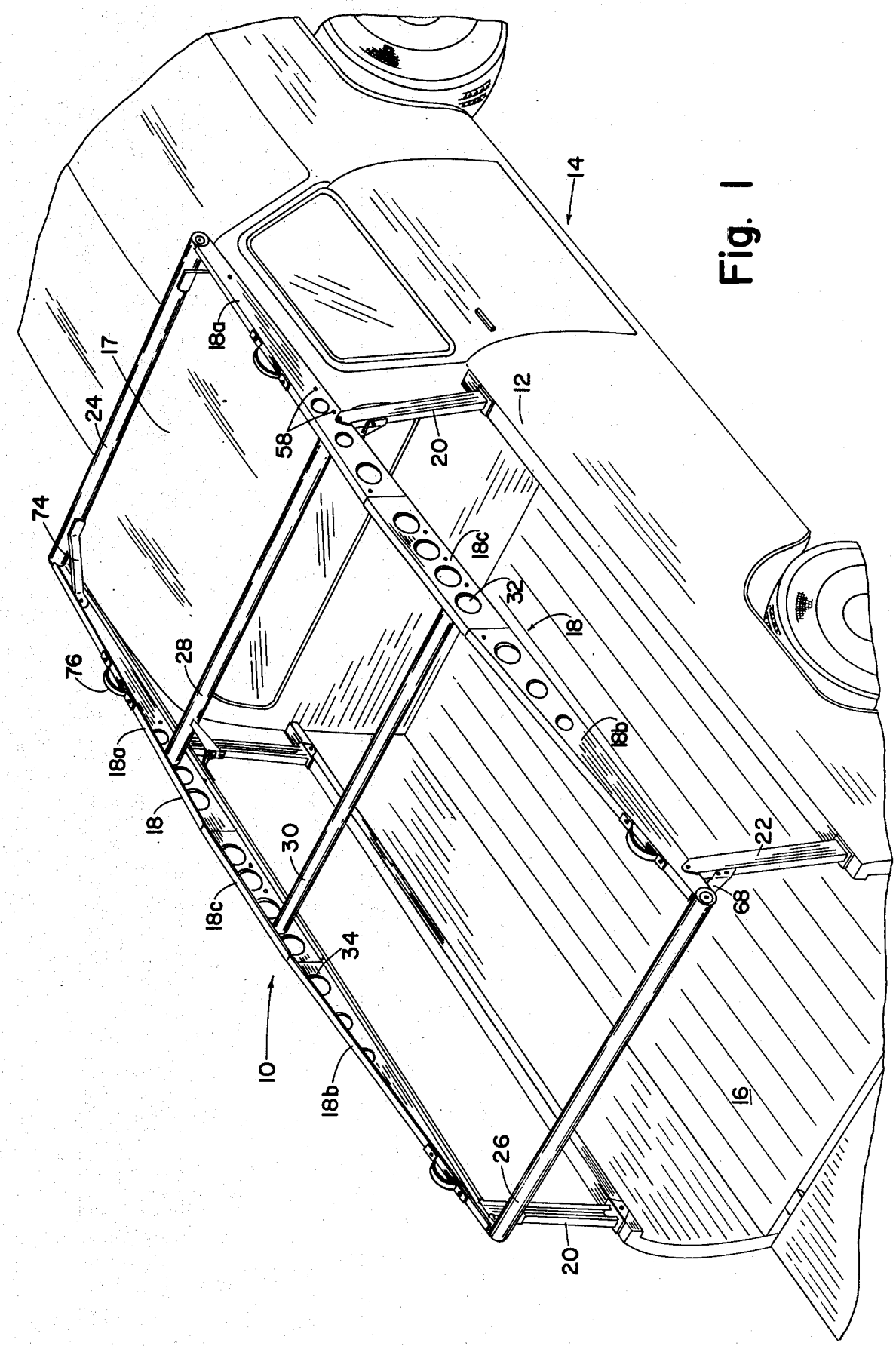
FIG. 1 is a view in perspective showing my cargo carrier mounted on a pickup truck.

Referring now to FIG. 1 with greater particularity the cargo carrier 10 of this invention is shown mounted on the side panels 12 of a pickup truck 14 so as to extend above and over the bed 16 and cab 17.

The cargo carrier 10 comprises channel side rails 18 made up of a front section 18a, a trailing section 18b and for longer truck beds, an intermediate extender section 18c. The side rails are supported on front and rear legs 20 and 22 and they are interconnected by front, rear and intermediate cross bars 24, 26 and 28 to support loads (not shown) extending fore and aft of the truck. When the intermediate extender section 18c is employed, an auxilary cross bar 30 is optional. In order to minimize weight, a plurality of openings 32 are provided along the length of the side rails 18 and, to increase rigidity, the metal around the opening is punched inward to form annular flanges 34 (FIG. 5). In addition, the flanges 36 of the channel are preferably bent over at 38 to further increase rigidity.

When the intermediate extender section 18c is employed, lateral channel extensions 40 (FIG. 5) which are carried thereon, are received in adjacent channel side rails 18a and 18b and secured firmly in place by means of bolts 42. When the extender section 18c is not employed, the fore and aft sections 18a and 18b are brought together end to end, and rigidly joined by means of a splice plate 44 (FIGS. 8 and 9) bolted at 46 and 48 to the web 33 and flanges 36 of the channel side rail.

The support legs 20 and 22 are generally of channel configuration, though with the legs of the channel turned inward toward each other at 50 to form a near box beam. The legs 20 and 22 are welded to angle feet 52 and are disposed as to incline slightly toward the center of the truck bed 16 for overall stability. Depending on the nature of the side panel construction the feet may be bolted through the top as at 52a (FIG. 6) or to the side, as at 52b (FIG. 2). At the tops of the legs 22 are angle side rail mounting brackets 54 with the vertical leg 54a being adapted to be bolted to the web of a side channel rail 18 and the horizontal leg is curled over at 56 to hook over the horizontal flange 36, 38 of the channel side rail 18.

The forward side rail sections 18a have a series of bolt holes 58 in the area that overlies the front end of the side panel so that the front leg 20 may be positioned as desired over the conventional vertical column of the side panel (not shown) according to the length of the truck bed 16.

As shown most clearly in FIGS. 2 and 4 the cross bars 24, 26, 28 and 30 are of tubular construction with the ends closed by a circular plate 60 welded thereto. Welded to the inside of the plate 60 is a nut 62 adapted to receive a bolt 64 to secure tubular cross bar to the side rails. In the case of the intermediate cross bar 28, a single bolt is used to secure the side rail 18 to the leg support bracket and to the tubular cross bar 28. Support brackets 66 may be bolted between the legs 20 and 22 and the side rails 18, and, in addition, a reinforcing gusset member 68 is welded to the cross bar and bolted through slots 69 to the legs 20 or 22. The slots 69 allow the legs 20 and 22 to be disposed at different angles to adjust to the width of the truck bed.

As shown in FIG. 7, the extremities of the side rails 18a and 18b are cut away at the 70 to accommodate the cross bar and the web is crimped at 72 for increased strength. Finally, tie down straps 76 are secured to the tops of the side rails 18 for the purpose of lashing loads in place.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A cargo carrier for a vehicle comprising:
a pair of channel member side rails to extend fore and aft of the truck with the flanges thereof facing inward;
said side rails being formed in forward and rear sections and including:
a central extender section having fore and aft extension thereon receivable in said forward and rear side rail sections;
a splice member receivable by said forward and rear side rail sections when same are placed end to end;
screw means for securing a selected one of said extender section and said splice member to said front and rear channel sections;
pairs of front and rear legs supporting said side rails;
mounting brackets carried on the tops of said legs;
hooks on said mounting brackets engaging over the lower flanges of said channel members;
a bolt hole through each of said brackets;
a series of spaced bolt holes through the lower flanges of said channel member side rails in the areas thereof to overlie the general locations of said front legs; and
bolts extending through the mounting brackets of said front legs and a selected, aligned pair of said spaced bolt holes.

2. The cargo carrier defined by claim 1 including:
intermediate and rear cross bars;
threaded nuts secured in the ends of said cross bars; and
bolts extending through said side rails and threaded into said nuts.

3. the cargo carrier defined by claim 2 including:
a forward cross bar having threaded nuts secured on the ends thereof; and
bolt means for securing said forward cross bar to the forward ends of said side rails.

4. The cargo carrier defined by claim 3 wherein:
said cross bars are of tubular cylindrical configuration; and
the tapped holes of said nuts are mounted generally coaxially therewith.

5. The cargo carrier defined by claim 2 including:
diagonal braces carried by said cross bars to extend transversely across said legs;
bolt means for securing said braces to said legs; and
slots in said braces receiving said bolt means to allow adjustment of angular disposition of said legs.

6. The cargo carrier defined by claim 1 including:
a series of flanged openings along the lengths of said side channel members to reduce the weight and increase the strength thereof.

* * * * *